United States Patent
Kraus et al.

(10) Patent No.: US 6,745,552 B2
(45) Date of Patent: Jun. 8, 2004

(54) FLUFFING ROLL FOR CROP HARVESTING MACHINES

(75) Inventors: Timothy J. Kraus, Hedrick, IA (US); John E. Cudoc, Madison, WI (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/280,822

(22) Filed: Oct. 25, 2002

(65) Prior Publication Data

US 2004/0079062 A1 Apr. 29, 2004

(51) Int. Cl.⁷ .............................................. A01D 76/00
(52) U.S. Cl. ........................................... 56/371; 56/372
(58) Field of Search ........................ 56/365, 367, 370, 56/371, 372, DIG. 4, 16.4 A

(56) References Cited

U.S. PATENT DOCUMENTS

| | | | | |
|---|---|---|---|---|
| 3,656,284 A | * | 4/1972 | Meek et al. ................. | 56/14.5 |
| 3,910,438 A | * | 10/1975 | Anderson et al. ........... | 414/501 |
| 4,175,886 A | * | 11/1979 | Moench et al. ............... | 404/90 |
| 4,177,625 A | * | 12/1979 | Knight et al. ................ | 56/13.6 |
| 4,251,980 A | * | 2/1981 | Miller ......................... | 56/14.4 |
| 4,274,247 A | * | 6/1981 | Schmidt et al. .............. | 56/14.4 |
| 4,565,057 A | * | 1/1986 | Vissers et al. ................ | 56/364 |
| 4,862,685 A | * | 9/1989 | Gasseling et al. ............ | 56/372 |
| 5,546,739 A | * | 8/1996 | Hettich ........................ | 56/367 |

FOREIGN PATENT DOCUMENTS

DE 4138358 A1 * 5/1993 .......... A01D/43/00

* cited by examiner

*Primary Examiner*—Thomas B. Will
*Assistant Examiner*—Alicia Torres
(74) *Attorney, Agent, or Firm*—John William Stader; Collin A. Webb

(57) ABSTRACT

The apparatus is a fluffing roll for installation on a crop harvesting machine to disperse the crop before it hits the ground thereby facilitating drying. The fluffing roll is a cylinder with auger flights on one half of the cylindrical surface that direct the cut crop in one direction, and auger flights on the other half of the cylindrical surface that direct cut crop in the direction opposite from the direction of the first half.

6 Claims, 4 Drawing Sheets

FLUFFING ROLL FOR CROP HARVESTING MACHINES

BACKGROUND OF THE INVENTION

This invention deals generally with crop harvesting machines such as mowers and mower conditioners and more specifically with a roll which discharges the crop in a uniform fluffy swath.

Many crop harvesting machines have cutting mechanisms that are a linear array of rotating discs with these discs arranged so that alternate discs rotate in opposite directions, that is, every other disc is counter-rotating. Such an arrangement has an effect that is not apparent at first consideration. The counter-rotating discs cause the crop to be discharged in several distinct narrow streams because each disc cuts and transports crop in the direction of its rotation. The number of narrow streams resulting from this action is actually one-half the number of rotating discs in the assembly. These somewhat compacted streams of cut crop tend to slow down the drying process due to uneven crop distribution.

Another feature of the typical crop mower-conditioner can further aggravate this problem. Typically, the conditioning unit on a mower-conditioner machine is located behind the disc cutters and its rotation and subsequent diverter shields tend to propel the cut crop down toward the ground. Depending upon the type of crop and its condition the result can be non-uniform and clumped crop material matted to the ground, so that drying is further hindered.

It would be very beneficial to have an apparatus on such disc mower-conditioners that handles the crop so that it is spread out and rests lightly on the ground.

SUMMARY OF THE INVENTION

The present invention is an additional roll located behind the disc cutter assembly of a mower or the conditioning roll of a mower-conditioner. This new roll, called a fluffing roll, spreads out the narrow individual streams of cut crop material formed by the counter-rotating discs, and furthermore, because of the placement of the fluffing roll the crop travels upward over the fluffing roll. This upward motion of the cut crop material further separates it and also permits it to settle gently and loosely onto the crop stubble, creating more ideal conditions for drying.

The fluffing roll has a rather unique configuration. Although it could easily be mistaken for an auger conveyor, it is actually the equivalent of two attached half cylinders of oppositely directed auger conveyors. The structure is a cylinder with the first half of the cylindrical surface having auger flights that move the cut crop in one direction and the other half of the cylindrical surface having auger flights that move cut crop in the direction opposite from the direction of the first half. There is also no trough or enclosure around the fluffing roll.

Thus, with the fluffing roll rotating, the narrow crop streams that are directed onto it from the rotating discs or the conditioner, are first moved to one side by, for example, the rightward directed auger blades which are at that time facing the oncoming cut crop streams. Then, as the fluffing roll completes one-half of its rotation, the oppositely directed auger blades come into position facing the incoming cut crop streams, so that for the next one-half rotation of the fluffing roll the cut crop streams are moved left. Since the fluffing roll is constantly rotating, the cut crop streams are always being moved from their points of impact alternately to the right and left, and each stream is discharged in a wider pattern, thus resulting in a single wide swath instead of several individual narrow paths.

To gain more benefit, the fluffing roll is rotated so that its surface that receives the cut crop streams is moving upward. Since there is no enclosure around the fluffing roll, this direction of rotation causes the crop material to not only move sideways but to also be propelled up and over the fluffing roll. This motion adds to the dispersal of the crop.

Another feature of the fluffing roll is that it does not necessarily require a power drive to turn it. Providing that the fluffing roll is located so that the cut crop leaving the previous stage strikes the fluffing roll above its centerline axis, the force of the crop cuttings will impart motion to the fluffing roll and be the only power required for rotation. This is true whether the previous stage is the disc cutter itself or a conditioner apparatus.

Thus, the fluffing roll of the invention can function to spread out the narrow streams originating at the disc cutter and deposit the spread crop on the ground without the requirement of a new power drive on the harvesting machine. However, it is also quite practical to also drive the fluffing roll, by conventional power sources, for instance a hydraulic motor or direct mechanical drive.

DETAILED DESCRIPTION OF THE INVENTION

Figure 1:
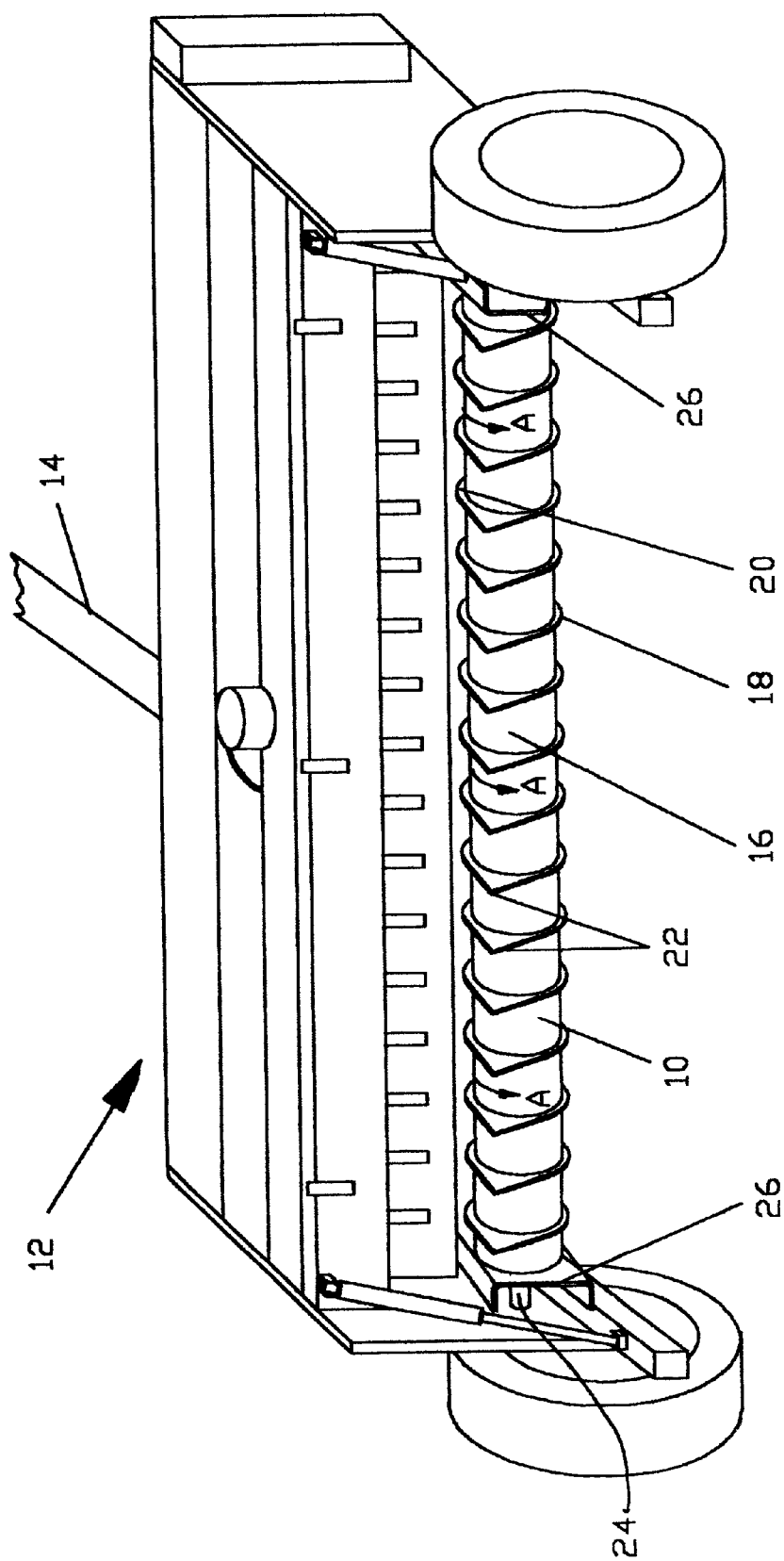
FIG. 1 is a perspective view of the fluffing roll of the invention installed at the rear of a crop harvesting machine showing one of the junctions of the oppositely directed auger flights.

FIG. 1 is a perspective view of fluffing roll 10 of the invention installed in the crop discharge path at the rear of crop harvesting machine 12 showing one of the junctions 22 of the oppositely directed auger flights. Except for the addition of fluffing roll 10, crop harvesting machine 12 is a conventional machine in all respects and is intended to be towed behind a tractor by means of draft tongue 14.

Fluffing roll 10 is actually reminiscent of a conventional auger conveyor, or more accurately, segments of two auger conveyors, the two constructed to move material in opposite directions along fluffing roll centerline 16. The structure of fluffing roll 10 is that of a cylinder with the first half cylinder surface segment having attached auger flights 18 that direct the cut crop in one direction, and the other half cylinder surface segment having attached auger flights 20 that direct cut crop in the direction opposite from the direction determined by flights 18. The sets of oppositely directed flights exactly match and meet each other on opposite sides of the fluffing roll 10. Thus, flights 18 meet flights 20 at two sets of junction points, one of which, 22, is seen in FIG. 1, while the other set of junction points is on the other side of fluffing roll 10. Fluffing roll 10 rotates upon center axis 24 which protrudes from its opposite ends and is conventionally installed within bearings (not shown) in end plates 26.

It should be appreciated that the cylinder surface of fluffing roll 10 can also be divided into more than two segments of oppositely directed auger flights. For example, if four surface segments are used, the cut crop would be moved in opposite directions with every quarter turn of the fluffing roll.

Figure 4:
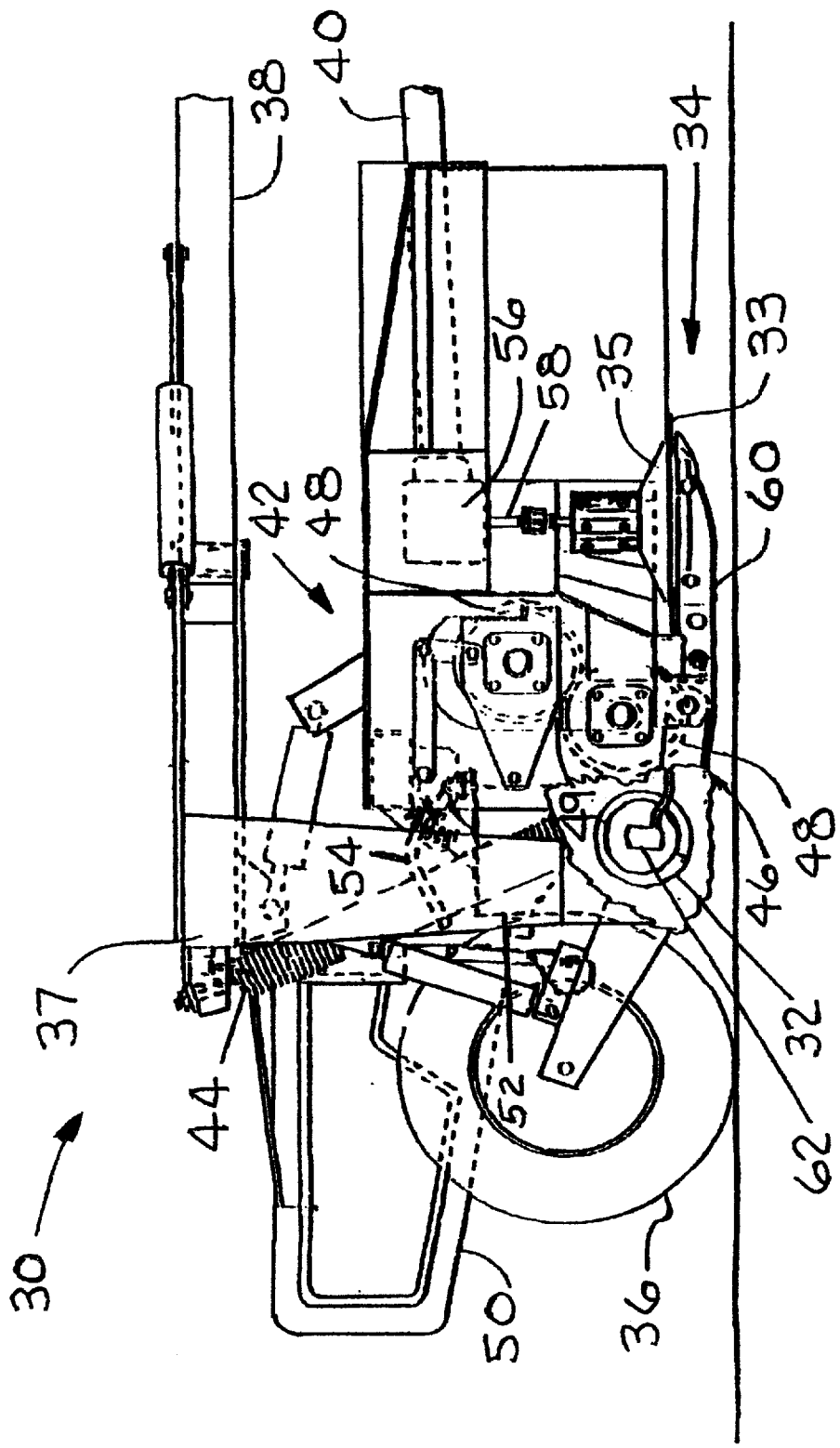
FIG. 4 is a side elevational view of a disc mower conditioner with a portion cut away to show the location of a fluffing roll.

Rotational motion can be imparted to fluffing roll 10 in two ways. One way, as shown in FIG. 4, is by delivering power to it by conventional devices such as hydraulic motors or mechanical linkage. The other, less obvious means of rotating fluffing roll 10 is by using the momentum of the cut crop itself. Providing that fluffing roll 10 is located so that the cut crop leaving the previous stage strikes the fluffing roll above its centerline axis 16, the force of the crop cuttings will impart motion to the fluffing roll and be the only power required to cause the surface facing the entering cut crop to move upward as indicated by arrows A in FIG. 1. This is true whether the previous stage is the disc cutter itself or a conditioner apparatus.

Figure 2:
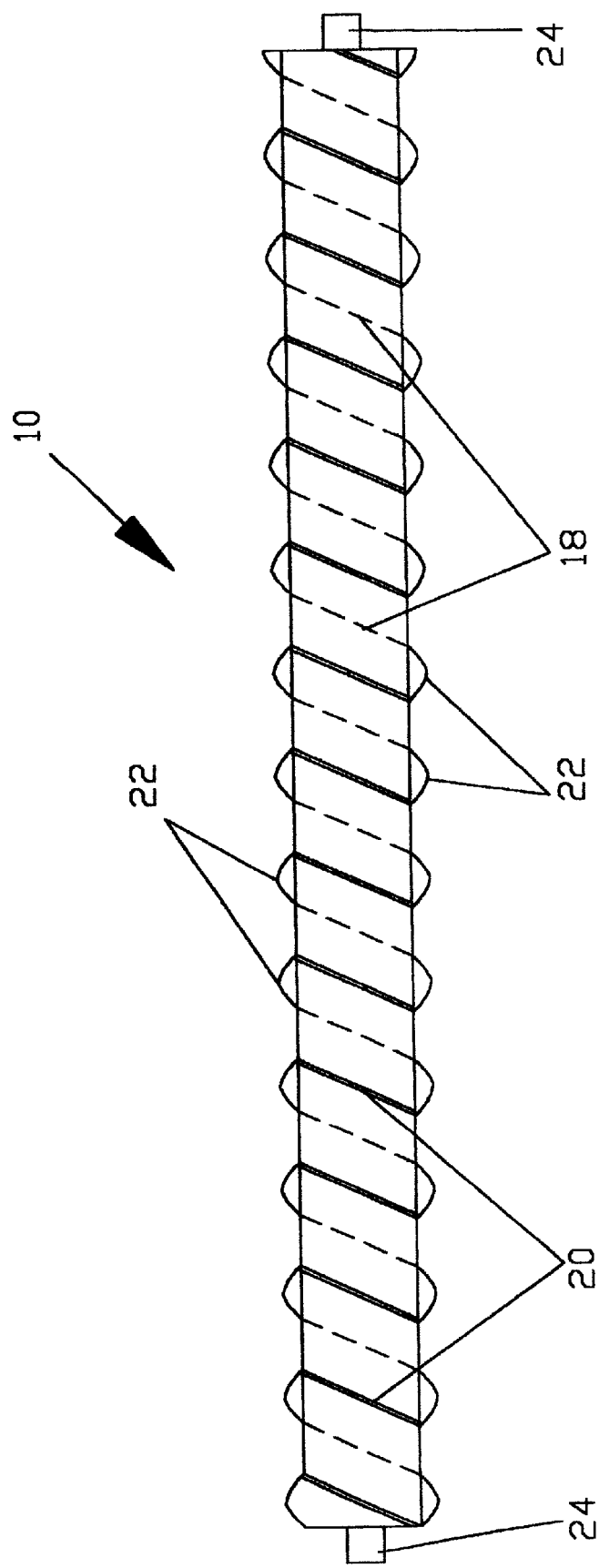
FIG. 2 is a schematic elevation view of the fluffing roll showing the auger flights on the first side.
Figure 3:
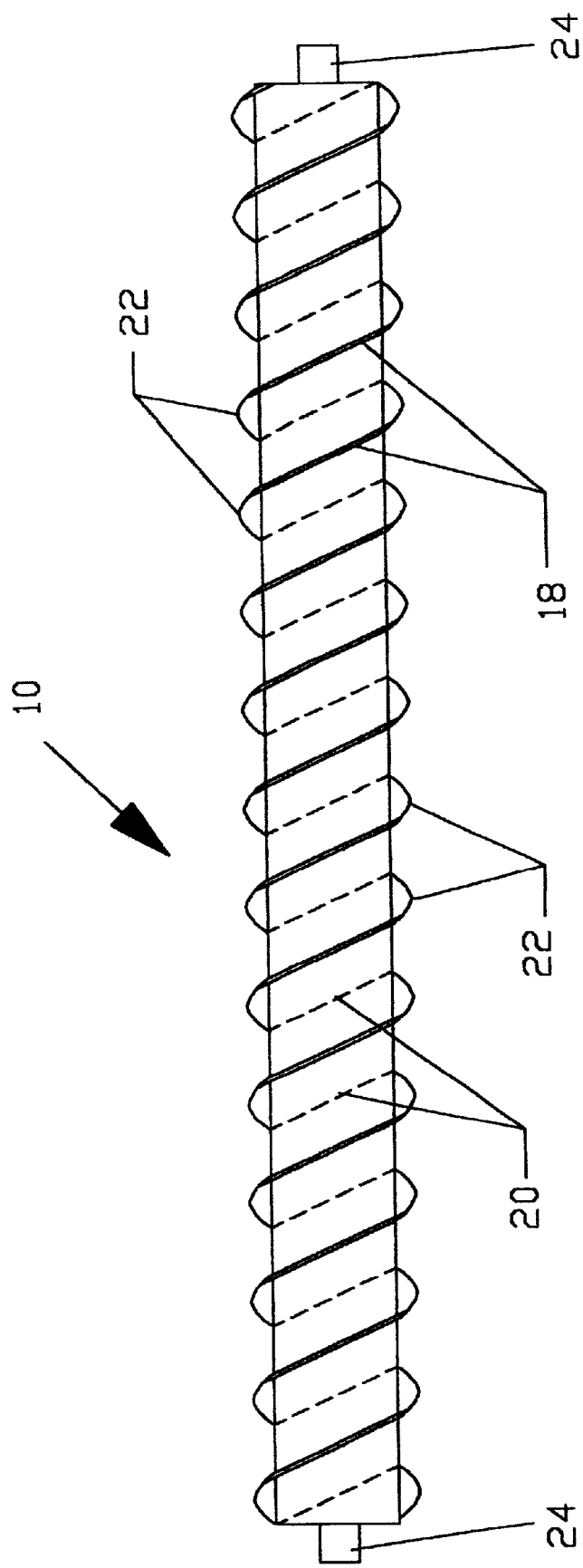
FIG. 3 is a schematic elevation view of the fluffing roll showing the auger flights on the second side.

FIG. 2 and FIG. 3 are schematic elevation views of fluffing roll 10 showing auger flights 18 and 20 on opposite sides of the roll. When junction points 22 are located on the top and bottom and fluffing roll 10 is viewed from either side, as in FIG. 2 and FIG. 3, fluffing roll 10 looks very much like a conventional auger conveyor. However, the subtlety of the configuration is that the two sets of flights are essentially parallel. Thus, when dashed lines are used to represent the flights on the far side of the roll, the conventional spiral formation is no longer seen, but the parallel configuration emerges.

Another way to visualize the configuration of the oppositely directed flights is to observe that in FIG. 2 the bottoms of all the flights are to the left of their tops, but in FIG. 3, when the roll has been rotated 180 degrees, the bottoms of all the flights are to the right of their tops. Thus, when fluffing roll is rotating so that the near surface in FIG. 2 is moving upward and crop material is striking it, as flights 20 turns upward, it deflects the crop material to the left. Then, once fluffing roll 10 has rotated around so that it appears as is shown in FIG. 3, the rotation of flights 18 upward deflects crop material to the right. It should be appreciated that the particular shape, slope, and pitch of the flights in FIGS. 2 and 3 is merely a schematic representation of one design, and those skilled in the art of auger conveyors may change those parameters to meet the requirements of the specific application. The important characteristic of the invention is that the flights on opposite sides of fluffing roll 10 must be constructed so that each side of the fluffing roll moves the cut crop striking it in a direction opposite from the direction determined by the other side.

FIG. 4 is a side elevational view of conventional disc mower conditioner 30 with a portion cut away to show the location of fluffing roll 32 in the crop discharge path. Disc mower conditioner 30 utilizes disc cutter bar 34.

Disc mower conditioner 30 is provided with a conventional frame 37, is supported over the ground by a pair of transversely spaced wheels 36, and has draft tongue 38 attached to a tractor (not shown) for towing, as is known in the art. Rotational power is delivered from the tractor (not shown) to the disc mower conditioner 30 by power-take-off (PTO) shaft 40 coupled with the tractor and rotated in a conventional manner. As is well known in the art, draft tongue 38 is pivotally connected to frame 37 with the pivotal movement being controlled by a hydraulic cylinder (not shown) interconnecting tongue 38 and frame 37. Through manipulation of the hydraulic cylinder, disc mower conditioner 30 can be moved between a transport position behind the tractor and an operating position outboard to the right of the tractor so that disc mower conditioner 30 can be operated with the tractor (not shown) avoiding the standing crop.

Frame 37 supports header 42 suspended from frame 37 by flotation mechanism 44, so that header 42 can move vertically relative to frame 37 to enable header 42 to follow ground undulations and to allow header 42 to be raised into an elevated transport position. Header 42 supports rotatable conditioning mechanism 46 that conditions the severed crop material, shown in this embodiment in the form of a pair of intermeshing conditioning rolls 48 that receive severed crop between them. Conditioning rolls 48 discharge the crop material rearwardly between a pair of laterally spaced windrow shields 50 that laterally restrict the severed and conditioned crop into a windrow formed behind disc mower conditioner 30.

Swathboard 52 is pivotally supported from frame 37 to be selectively pivotable into engagement with the crop material discharged from conditioning mechanism 46 to deflect the crop material downwardly into a swath substantially as wide as the width of the cut of header 42 before the discharge crop material can reach the windrow shields 50. Pivotal movement of swathboard 52 is controlled by handle control mechanism 54.

Disc cutter bar 34 is supported at the leading edge of header 42. Disc cutter bar 34 is supported from header 42 by a pair of laterally spaced support arms 60 that are connected to the remote transverse ends of cutter bar 34. Generally, cutter bar 34 is provided with a number of transversely spaced, rotatable disc cutters 35 carrying knives 33 that operate to sever standing crop material by impact because of the rotation of disc cutters 35. Power for driving the rotation of disc cutters 35 is supplied by PTO shaft 40 through gearbox 56 to a power input shaft 58 driving the rotation of disc cutters 35. Similarly, fluffing roll 32 can also be rotated by a direct mechanical linkage from PTO shaft 40.

Fluffing roll 32 is shown in its position within header 42 by removing a cutout portion of the sides of header 42 for viewing. Fluffing roll 32 is mounted with its axis parallel to conditioning rolls 48 but behind and somewhat below conditioned crop exit 49 of conditioning mechanism 46. Thus, as the crop exits conditioning rolls 48 it is caught by fluffing roll 32 and dispersed to both sides of its original path by its oppositely directed auger structure as described in regard to FIGS. 2 and 3. FIG. 4 shows hydraulic motor 62 located on the end of fluffing roll 32 where it serves as a very convenient means to power the rotation of fluffing roll 32. Hydraulic motor 62 is powered from a conventional hydraulic system (not shown) installed on crop harvesting machine 30.

When installed in the crop discharge path of a crop harvesting machine, the rotating fluffing roll of the present invention, with its oppositely directed flights on opposite sides, propels the streams of cut crop striking it, alternately to one side and then to the other. Furthermore, because the surface receiving the cut crop is moving upward, it also tosses the crop into the air so that it settles lightly to the ground in a dispersed pattern. This dispersal provides a significant advantage for the desired drying of the crop on the ground.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, fluffing roll 10 can be divided into more than two surface segments so that the direction of the cut crop is changed more than twice during every rotation of the fluffing roll. Furthermore, means of rotating fluffing roll 10 can be used other than those shown.

What is claimed as new and for which Letters Patent of the United States are desired to be secured is:

1. A fluffing roll for dispersing cut crop being discharged from a crop harvesting machine comprising:

a rotating cylinder structure with a center axis and divided by a radial plane extending from the center axis radially outward into a first partial circumferential cylinder surface and at least one other partial circumferential cylinder surface, with the cylinder structure installed in a crop harvesting machine so that cut crop being discharged from the crop harvesting machine strikes the cylinder structure;

a first set of auger flights attached on one side of the radial plane to the first partial circumferential cylinder surface and moving the cut crop in a first direction along the cylinder structure; and another set of auger flights attached to at least one other partial circumferential cylinder surface and moving the cut crop in a direction along the cylinder structure opposite from the first direction of cut crop.

2. The fluffing roll of claim 1 wherein the number of partial circumferential cylinder surfaces is two and the cylinder structure is divided into two circumferential half cylinder surfaces.

3. The fluffing roll of claim 1 wherein the cylinder structure is located so that the cut crop strikes the cylinder structure and the momentum of the cut crop imparts motion to the fluffing roll.

4. The fluffing roll of claim 1 wherein the cylinder structure is located so that the cut crop strikes the cylinder structure above the center axis of the cylinder structure and the momentum of the cut crop imparts motion to the fluffing roll that moves the cut crop upward.

5. The fluffing roll of claim 1 wherein the cylinder structure is rotated by a drive apparatus powered from the crop harvesting machine.

6. The fluffing roll of claim 1 wherein a second radial plane extends radially outward from the center axis and the radial plane and the second radial plane delimit the first partial circumferential cylinder surface and the at least one other partial cylinder surface.

\* \* \* \* \*